(12) United States Patent
Maedako et al.

(10) Patent No.: US 10,418,924 B2
(45) Date of Patent: Sep. 17, 2019

(54) ENGINE GENERATOR WITH A BOOSTING CIRCUIT FOR STARTING AN ENGINE

(71) Applicant: Honda Motor Co., Ltd., Tokyo (JP)

(72) Inventors: Minoru Maedako, Wako (JP); Tetsuya Matsuhisa, Wako (JP); Kenji Shibata, Wako (JP); Wataru Matsuyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/938,734

(22) Filed: Mar. 28, 2018

(65) Prior Publication Data

US 2018/0287534 A1 Oct. 4, 2018

(30) Foreign Application Priority Data

Mar. 30, 2017 (JP) .................. 2017-066551

(51) Int. Cl.
| | |
|---|---|
| *H02M 3/155* | (2006.01) |
| *H02P 9/04* | (2006.01) |
| *H02M 7/493* | (2007.01) |
| *H02M 5/458* | (2006.01) |
| *H02P 9/48* | (2006.01) |
| *H02P 9/08* | (2006.01) |

(52) U.S. Cl.
CPC .............. *H02P 9/04* (2013.01); *H02M 3/155* (2013.01); *H02M 5/458* (2013.01); *H02M 7/493* (2013.01); *H02P 9/48* (2013.01); *H02P 9/08* (2013.01); *H02P 2201/09* (2013.01)

(58) Field of Classification Search
CPC ... H02P 1/24; H02J 3/36; H02J 5/005; H02M 5/4585; H02M 7/797; H02M 1/36
See application file for complete search history.

(56) References Cited

U.S. PATENT DOCUMENTS

| | | | | |
|---|---|---|---|---|
| 5,237,260 A | * | 8/1993 | Takakado | ................ H02J 9/062 |
| | | | | 322/10 |
| 2011/0121769 A1 | * | 5/2011 | Rozman | .............. B60L 11/1811 |
| | | | | 318/400.27 |
| 2012/0291739 A1 | * | 11/2012 | Hashimoto | ............. F02N 11/08 |
| | | | | 123/179.3 |
| 2017/0288575 A1 | * | 10/2017 | Kitada | .................. H02M 1/126 |

FOREIGN PATENT DOCUMENTS

| | | | | | |
|---|---|---|---|---|---|
| EP | 0488108 A1 | * | 6/1992 | | ............. H02J 9/062 |
| JP | 4203471 A | * | 7/1992 | | |
| JP | 6022461 A | * | 1/1994 | | |
| JP | 5839835 B2 | | 1/2016 | | |

OTHER PUBLICATIONS

A machine translation of Yoshida (JP06-022461); 10 pages, translated Jan. 4, 2019.*

* cited by examiner

*Primary Examiner* — Harry R Behm
(74) *Attorney, Agent, or Firm* — Duft & Bornsen, PC

(57) ABSTRACT

An engine generator, including a generator unit driven by the engine, a first power converter circuit, a capacitor, a second power converter circuit, a smoothing circuit, battery and a control unit. The control unit controls operation of the switching elements of the second power converter circuit so as to form a boosting circuit by the battery, the coil of the smoothing circuit, the switching element and the diode of the second power converter circuit, and the capacitor at starting of the engine.

2 Claims, 2 Drawing Sheets

ENGINE GENERATOR WITH A BOOSTING CIRCUIT FOR STARTING AN ENGINE

CROSS-REFERENCE TO RELATED APPLICATION

This application is based upon and claims the benefit of priority from Japanese Patent Application No. 2017-066551 filed on Mar. 30, 2017, the content of which is incorporated herein by reference.

BACKGROUND OF THE INVENTION

Field of the Invention

This invention relates to an engine generator capable of operating as an engine starter motor

Description of the Related Art

As engine-generators of this type, there are known ones equipped with a starter-generator driver for operating a generator unit as a generator and as a starter motor. For example, a generator taught by JP5839835B has a starter-generator driver that includes a DC/DC converter and starts an engine by passing battery output boosted by the DC/DC converter through a winding of the generator unit to rotate a rotor of the generator unit with respect to a stator.

However, owing to the need to additionally incorporate the DC/DC converter for boosting battery output, the generator according to JP5839835B has an increased number of parts, greater weight and higher cost.

SUMMARY OF THE INVENTION

An aspect of the present invention is an engine generator, including: an engine; a generator unit configured to be driven by the engine; a first power converter circuit configured to be electrically connected to the generator unit and to rectify power generated by the generator unit to DC current; a capacitor configured to be electrically connected to the first power converter circuit and to smooth DC current rectified by the first power converter circuit; a second power converter circuit configured to be electrically connected to the capacitor, to convert DC current smoothed by the capacitor to AC current and to have multiple switching elements and the multiple diodes connected one in parallel with each multiple switching element; a smoothing circuit configured to be electrically connected to the second power converter circuit, to smooth AC current converted by the second power converter circuit, to supply the smoothed power to an electrical load and to have a coil; a DC power source configured to be connectable to the smoothing circuit; and a control unit configured to control operation of the switching elements of the second power converter circuit so as to form a boosting circuit by the DC power source, the coil of the smoothing circuit, the switching element and the diode of the second power converter circuit, and the capacitor at starting of the engine.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention is explained with reference to FIGS. 1 to 3 in the following. An engine generator according to the embodiment of the present invention is a portable or mobile generator of weight and size a user can carry by hand.

Figure 1:
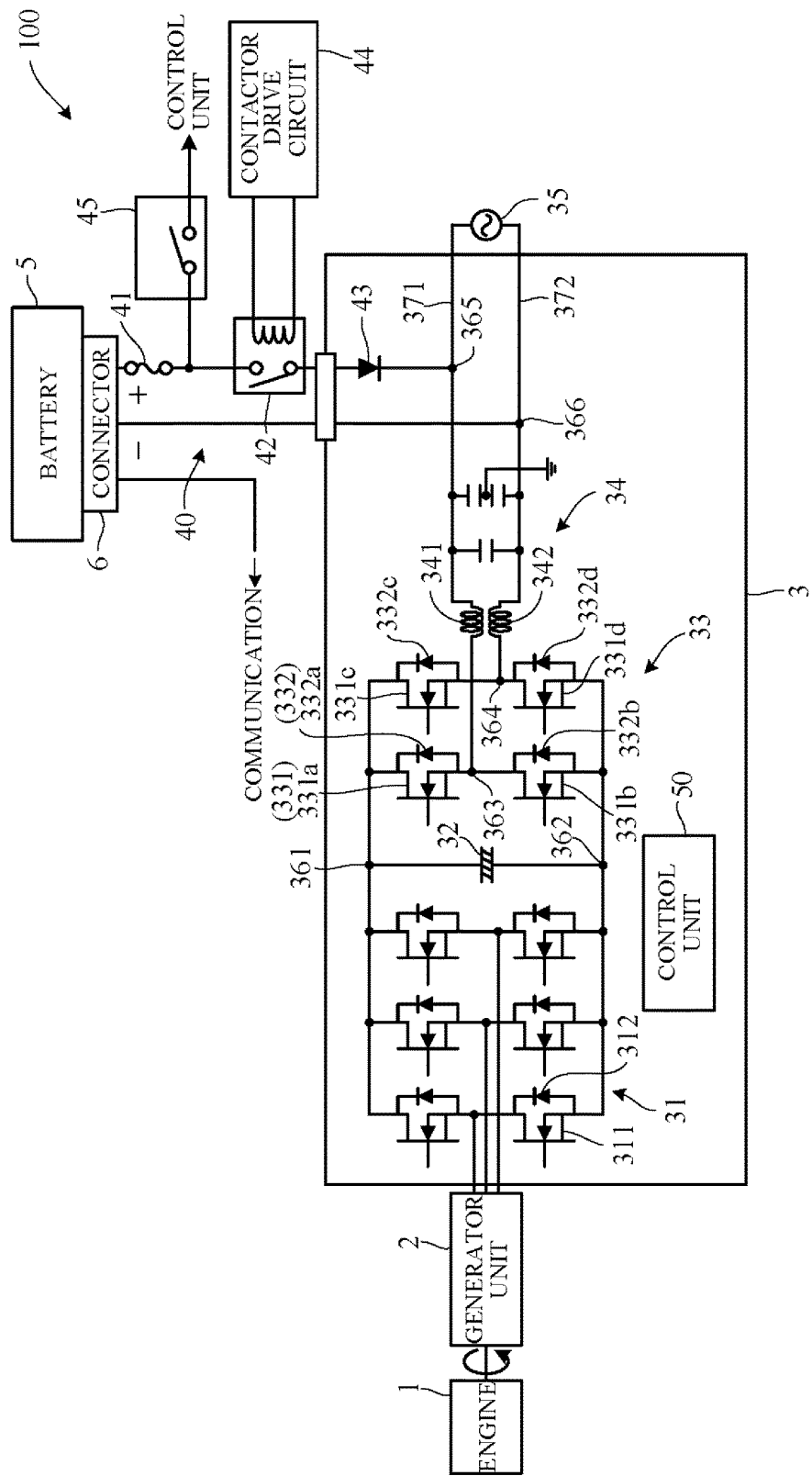
FIG. 1 is an electrical circuit diagram showing an overall configuration of the engine generator according to the embodiment of the present invention.

FIG. 1 is an electrical circuit diagram showing an overall configuration of the engine generator 100 according to the embodiment of the present invention. As shown in FIG. 1, the engine generator 100 includes a general purpose engine 1, a generator unit 2 driven by the engine 1, and an inverter unit 3 electrically connected to the generator unit 2.

The engine 1 is, for example, a spark ignition, air cooled, gasoline fueled engine with a piston that reciprocates inside a cylinder and a crankshaft (output shaft) that rotates synchronously with the piston. Motive power of the engine 1 is output through the crankshaft to the generator unit 2.

The generator unit (generator main unit) 2 is a multipolar alternator driven by the engine 1 to generate AC power. It includes a rotor connected to and rotated integrally with the crankshaft and a stator arranged concentric with the rotor to face a peripheral surface thereof. The rotor is provided with permanent magnets. The stator is provided with UVW windings arranged at phase angle differences of 120 degree. As described below, the generator unit 2 can be driven as a starter motor by power from a battery 5, in which case the engine 1 can be started without using the recoil starter.

The inverter unit 3 electrically connected to the generator unit 2 includes a first power converter circuit 31 for rectifying three-phase AC current output by the generator unit 2, a capacitor 32 electrically connected to the first power converter circuit 31 for smoothing DC current rectified by the first power converter circuit 31, a second power converter circuit 33 electrically connected to the capacitor 32 for converting DC current smoothed by the capacitor 32 to AC current, a smoothing circuit 34 electrically connected to the second power converter circuit 33 for smoothing AC current converted by the second power converter circuit 33, a control unit 50 for controlling switching operation of switching elements included in the first power converter circuit 31 and the second power converter circuit 33.

The first power converter circuit 31 is configured as an H-bridge circuit and includes three pairs of (a total of six) semiconductor switching elements 311 connected to respective U-phase, V-phase and W-phase windings of the generator unit 2. The switching elements 311 are, for example, configured as MOSFET, IGBT or other transistors, and diodes (e.g., parasitic diodes) 322 are connected in parallel with the switching elements 311.

A gate of the switching element 311 is driven by a control signal output from the control unit 50, and ON-OFF switching of the switching elements 311 is controlled by the control unit 50. For example, when the generator unit 2 operates as a generator, the switching elements 311 are turned OFF, so that that three-phase AC is rectified by the diodes 312. The rectified current is smoothed by a capacitor 32 and sent to the inverter 32. When the generator unit 2 operates as a starter motor, the first power converter circuit 31 ON-OFF controls the switching elements 311 to convert DC supplied from the battery 5 to three-phase AC for output to the generator unit 2. The second power converter circuit 33 is connected the capacitor 32 via a positive terminal 361 and a negative terminal 362.

The second power converter circuit 33 has two pairs of (a total of four) semiconductor switching elements 331 configured as an H-bridge circuit. The switching elements 331 are constituted using transistors such as MOSFETs or IGBTs, for example, and a diode (e.g., parasitic diode) 322 is connected in parallel with each switching element 331. A gate of the switching element 331 is driven by a control signal output from the control unit 50, ON-OFF switching of the switching elements 331 is controlled by the control unit 50, and DC current is converted to a single phase AC. The second power converter circuit 33 is connected with smoothing circuit 34 via a pair of output terminal 363 and 364.

A more detailed explanation of the configuration of the second power converter circuit 33 follows. The switching elements 331 include a first switching element 331a located between the positive terminal 361 of the capacitor 32 and the output terminal 363 of the second power converter circuit 33, a second switching element 331b located between the negative terminal 362 of the capacitor 32 and the output terminal 363 of the second power converter circuit 33, a third switching element 331c located between the positive terminal 361 of the capacitor 32 and the output terminal 364 of the second power converter circuit 33, and a fourth switching element 331d located between the negative terminal 362 of the capacitor 32 and the output terminal 364 of the second power converter circuit 33.

The diodes 332 include a first diode 332a whose anode is connected to the output terminal 363 of the second power converter circuit 33 and cathode is connected to the positive terminal 361 of the capacitor 32, a second diode 332b whose anode is connected to the negative terminal 362 of the capacitor 32 and cathode is connected to the output terminal 363 of the second power converter circuit 33, a third diode 332c whose anode is connected to the output terminal 364 of the second power converter circuit 33 and cathode is connected to the positive terminal 361 of the capacitor 32, a fourth diode 332d whose anode is connected to the negative terminal 362 of the capacitor 32 and cathode is connected to the output terminal 364 of the second power converter circuit 33.

The smoothing circuit (filter circuit) 34 includes a pair of coils (reactors) 341 and 342 and a capacitor. The smoothing circuit 34 smooths single-phase AC current received from the capacitor 32 to sine wave and outputs it through a pair of power lines 371 and 372 to an electrical load 35.

The power lines 371 and 372 are electrically connected through a power supply circuit 40 to the battery 5. The battery 5 has a specified capacity (e.g., 12V). The power supply circuit 40 is arranged so as to connect the battery 5 through a connector 6 to positive and negative output terminals 365 and 366 of the smoothing circuit 34 on the power lines 371 and 372. More exactly, a positive pole (terminal) of the battery 5 is connected through a fuse 41, contactor 42 and diode 43 to the positive output terminal 365, and a negative pole of the battery 5 is connected to the negative output terminal 366.

The contactor 42 includes a switching unit for electrically connecting (ON) and disconnecting (OFF) the battery 5 to and from the inverter unit 3, and its ON-OFF operation is controlled by a contactor drive circuit 44. A battery switch 45 is connected between the fuse 41 and the contactor 42, and power is supplied to the control unit 50 by turning the battery switch 45 ON. This causes the contactor drive circuit 44 to turn the contactor 42 ON. When the battery switch 45 is turned OFF, the contactor drive circuit 44 turns the contactor 42 OFF. In other words, the contactor 42 is turned ON and OFF conjointly with ON-OFF operation of the battery switch 45.

When the engine 1 is to be started by power from the battery 5, the user turns the battery switch 45 ON. This turns the contactor 42 ON, and power of the battery 5 is supplied to the generator unit 2 through the smoothing circuit 34 the second power converter circuit 33 the capacitor 32 and the first power converter circuit 31 of the inverter unit 3.

At this time, the control unit 50 determines whether the battery switch 45 is ON, and when it determines the battery switch 45 to be ON, it ON-OFF controls the switching elements 311 of the first power converter circuit 31 to convert DC power to AC power. The resulting AC power is supplied to the generator unit 2, so that a revolving magnetic field is produced in a stator winding and a rotor of the generator unit 2 rotates. As a result, a crankshaft 11 is rotated and the engine 1 can be started by cranking. A communication line is connected to the connector 6, and internal temperature, charge state and other battery 5 data are transmitted through this communication line to the control unit 50.

A point requiring attention here is that when the engine 1 is started in this manner, a predetermined voltage (e.g., 200V) needs to be applied to the generator unit 2 in order to operate the generator unit 2 as a starter motor. For this, it is necessary to boost the voltage from the battery 5, but separately installing a DC/DC converter or the like for this purpose leads to an increased number of parts, greater weight and higher cost. In the present embodiment, therefore, the existing inverter circuit (inverter unit 3) is configured to do double duty as a boosting circuit that is in turn configured to boost voltage of the battery 5 to a predetermined voltage.

Figure 2:
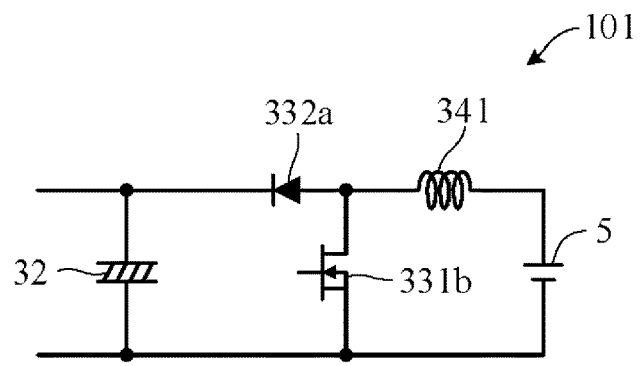
FIG. 2 is a diagram showing configuration of a boosting circuit formed by part of the electrical circuit of FIG. 1.

FIG. 2 is a diagram showing configuration of a boosting circuit 101 formed by part of the electrical circuit of FIG. 1. As shown in FIG. 2, the boosting circuit 101 includes the battery 5, the coil 341 of the smoothing circuit 34, the second switching element 331b and first diode 332a of the second power converter circuit 33, and the capacitor 32.

Figure 3:
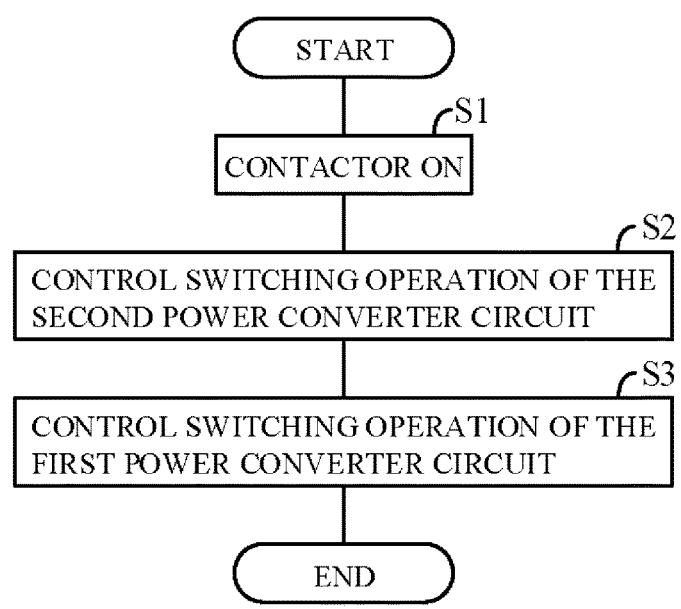
FIG. 3 a flowchart showing an example of processing performed by the control unit of FIG. 1.

FIG. 3 is a flowchart showing an example of processing performed by the control unit 50, particularly an example of processing at the time of starting the engine-generator 100. The processing indicated by this program is started, for example, when the battery switch 45 is turned ON and power supplied to the control unit 50 in an inactive state of the engine-generator 100 and an unconnected state of the electrical load 35, and repeated at predetermined intervals until starting of the engine 1 is completed.

First, in S1 (S: processing Step), a control signal is output to the contactor drive circuit 44 to turn the contactor 42 ON. This supplies power of the battery 5 through the power supply circuit 40 to the inverter unit 3.

Next, in S2, control signal is output to the switching elements 331 of the second power converter circuit 33 so as to control their switching operation. Specifically, the first switching element 331a, third switching element 331c and fourth switching element 331d of the second power converter circuit 33 are turned OFF, and the second switching element 331b thereof is turned ON and OFF periodically at predetermined intervals.

When the second switching element 331b is turned ON, current from the battery 5 flows through the coil 341 of the smoothing circuit 34 and the second switching element 331b, thereby storing electrical energy in the coil 341. When the second switching element 331b turns OFF, current from the battery 5 flows through the coil 341 and the diode 332a. At this time, energy stored in the coil 341 is added to power of the battery 5 and output, whereby boosted power can be supplied to the first power converter circuit 31.

In S3, control signals are output to the switching elements 331 of the first power converter circuit 31 to switch the switching elements 331 ON and OFF. As this causes three-phase AC current to flow through the stator winding of the generator unit 2, the rotor can be rotationally driven. The crankshaft can therefore be rotated to crank and start the engine 1.

The present embodiment can achieve advantages and effects such as the following.

(1) The engine-generator 100 includes: the engine 1; the generator unit 2 driven by the engine 1; the first power converter circuit 31 that is electrically connected to the generator unit 2 and rectifies power generated by the generator unit 2 to DC current; the capacitor 32 that is electrically connected to the first power converter circuit 31 and smooths DC current rectified by the first power converter circuit 31; the second power converter circuit 33 that is electrically connected to the capacitor 32, converts DC current smoothed by the capacitor 32 to AC current and has the multiple switching elements 331 and the multiple diodes 332 connected one in parallel with each multiple switching element 331; and the smoothing circuit 34 that is electrically connected to the second power converter circuit 33, smooths AC current converted by the second power converter circuit 33, supplies the smoothed power to the electrical load 35 and has the coil 341 (FIG. 1). The engine-generator 100 further includes the battery 5 connectable to the smoothing circuit 34, and the control unit 50 that at starting of the engine 1 controls operation of the switching elements 331 of the second power converter circuit 33 so as to form the boosting circuit 101 by the battery 5, the coil 341 of the smoothing circuit 34, the switching element 331 (second switching element 331b) and the diode 332 (first diode 332a) of the second power converter circuit 33, and the capacitor 32 (FIGS. 1 and 2).

Owing to this configuration, the boosting circuit 101 can be formed by putting an existing inverter circuit to double duty. As separate provision of a DC/DC converter or the like is therefore unnecessary, the boosting circuit 101 can be configured with minimal increase in number of parts, weight and cost. In other words, power of the battery 5 can be boosted and supplied to the generator unit 2 with a simple configuration. Moreover, since a configuration is adopted that boosts voltage of the battery 5 with the booster circuit 101, the generator unit 2 (engine 1) can be easily started without using a high-voltage battery.

(2) The output terminals 363 and 364 of the second power converter circuit 33 can be connected through the smoothing circuit 34 to the positive terminal and negative terminal, respectively, of the battery 5 (FIG. 1). The second power converter circuit 33 includes the first switching element 331a located between the positive terminal 361 of the capacitor 32 and the output terminal 363, the second switching element 331b located between the negative terminal 362 of the capacitor 32 and the output terminal 363, the first diode 332a whose anode is connected to the output terminal 363 and cathode is connected to the positive terminal 361, and the second diode 332b whose anode is connected to the negative terminal 362 and cathode is connected to the output terminal 363 (FIG. 2). At starting of the engine 1, the control unit 50 turns the first switching element 331a OFF and turns the second switching element 331b ON and OFF periodically at predetermined intervals. The ON-OFF control of the first switching elements 331a and 331b of the second power converter circuit 33 in this manner facilitates configuration because it enables formation of the boosting circuit 101 without adding new components.

(3) The engine-generator 100 includes the contactor 42 for establishing and cutting off connection between the smoothing circuit 34 and the battery 5 (FIG. 1). At starting of the engine 1, the control unit 50 additionally controls the contactor 42 (contactor drive circuit 44) so as to connect the smoothing circuit 34 and the battery 5. As a result, power from the battery 5 is supplied to the inverter circuit and boosted only at engine starting, whereby appropriate operation of the generator unit 2 as a starter motor can be ensured.

In the aforesaid embodiment, the control unit 50 serving as control means performs processing whereby voltage of the battery 5 (DC power supply) is boosted at starting of the engine 1 by turning the first switching element 331a located between the positive terminal 361 (first terminal) of the capacitor 32 and the output terminal 363 (first output terminal) OFF and turning the second switching element 331b located between the negative terminal 362 (second terminal) of the capacitor and the output terminal 363 ON and OFF periodically at predetermined intervals, but the control means is not limited to the electrical circuit configuration shown in FIG. 1 and can be of any configuration insofar as operation of the switching elements of the second power converter circuit is controlled so as to form the booster circuit from the DC power supply, the coil of the smoothing circuit, the switching element and diode of the second power converter circuit, and the capacitor. For example, the second power converter circuit can be adapted to output three-phase AC current instead of single-phase AC current. Although the aforesaid embodiment is adapted to establish and cut off connection between the battery 5 and the smoothing circuit 34 by means of the contactor 42, the switching unit is not limited to this configuration.

The above embodiment can be combined as desired with one or more of the above modifications. The modifications can also be combined with one another.

The present invention enables formation of a boosting circuit by putting an existing inverter circuit to double duty, without need to provide a separate a DC/DC converter or the like, and therefore minimizes increase in number of parts, weight and cost Above, while the present invention has been described with reference to the preferred embodiments thereof, it will be understood, by those skilled in the art, that various changes and modifications may be made thereto without departing from the scope of the appended claims.

What is claimed is:

1. An engine generator, comprising:
an engine;
a generator unit configured to be driven by the engine;
a first power converter circuit configured to be electrically connected to the generator unit and to rectify power generated by the generator unit to DC current;
a capacitor configured to be electrically connected to the first power converter circuit and to smooth DC current rectified by the first power converter circuit;
a second power converter circuit configured to be electrically connected to the capacitor, to convert DC current smoothed by the capacitor to AC current and to have multiple switching elements and multiple diodes connected one in parallel with each of the switching elements;

a smoothing circuit configured to be electrically connected to the second power converter circuit through a first output terminal and a second output terminal and to an electrical load through a first power line of a positive side and a second power line of a negative side, to smooth AC current converted by the second power converter circuit, to supply the smoothed AC current to the electrical load and to have a pair of coils;

a DC power source configured to be connectable to the smoothing circuit; and a control unit configured to control operation of the switching elements of the second power converter circuit so as to form a boosting circuit by the DC power source, the pair of coils of the smoothing circuit, a switching element and a diode of the second power converter circuit, and the capacitor at starting of the engine, wherein the pair of coils are a first coil including a first end connected to the first output terminal and a second end connected to the first power line, and a second coil including a first end connected to the second output terminal and a second end connected to the second power line, wherein a positive pole of the DC power source is connectable to the first coil through the first power line and a negative pole of the DC power source is connectable to the second coil through the second power line;

wherein the second power converter circuit includes a first switching element located between a first terminal of a positive side of the capacitor and the first output terminal, a second switching element located between a second terminal of a negative side of the capacitor and the first output terminal, a third switching element located between the first terminal and the second output terminal, a fourth switching element located between the second terminal and the second output terminal, a first diode whose anode is connected to the first output terminal and cathode is connected to the first terminal, a second diode whose anode is connected to the second terminal and cathode is connected to the first output terminal, a third diode whose anode is connected to the second output terminal and cathode is connected to the first terminal, and a fourth diode whose anode is connected to the second terminal and cathode is connected to the second output terminal, and wherein at starting of the engine, the control unit turns the first switching element, the third switching element, and the fourth switching element OFF, and turns the second switching element ON and OFF periodically at predetermined intervals.

2. The engine generator according to claim 1, further comprising a switching unit configured to establish and cut off connection between the smoothing circuit and the DC power source, wherein the control unit additionally controls the switching unit so as to connect the smoothing circuit and the DC power source at starting of the engine.

* * * * *